(12) United States Patent
De Graaff

(10) Patent No.: US 9,356,490 B2
(45) Date of Patent: May 31, 2016

(54) ELECTRIC MACHINE AND METHOD TO RETROFIT AN ELECTRIC MACHINE

(71) Applicant: ALSTOM Technology Ltd, Baden (CH)

(72) Inventor: Tjerk Michiel De Graaff, Brugg (CH)

(*) Notice: Subject to any disclaimer, the term of this patent is extended or adjusted under 35 U.S.C. 154(b) by 387 days.

(21) Appl. No.: 13/848,949

(22) Filed: Mar. 22, 2013

(65) Prior Publication Data

US 2013/0249333 A1 Sep. 26, 2013

(30) Foreign Application Priority Data

Mar. 22, 2012 (EP) .................................. 12160790

(51) Int. Cl.
*H02K 9/00* (2006.01)
*H02K 9/04* (2006.01)
*H02K 15/00* (2006.01)
*H02K 9/12* (2006.01)

(52) U.S. Cl.
CPC .. *H02K 9/04* (2013.01); *H02K 9/12* (2013.01); *H02K 15/0006* (2013.01); *Y10T 29/49009* (2015.01)

(58) Field of Classification Search
CPC ........ H02K 9/04; H02K 9/12; H02K 15/0006
USPC .............................. 310/52, 54, 58–59, 62–63
See application file for complete search history.

(56) References Cited

U.S. PATENT DOCUMENTS

| 6,798,079 | B2 * | 9/2004 | Nelson | F01D 25/12 290/2 |
| 2002/0047340 | A1 * | 4/2002 | Lewis | H02K 7/025 310/52 |
| 2005/0035673 | A1 * | 2/2005 | Lafontaine | H02K 1/187 310/58 |

FOREIGN PATENT DOCUMENTS

| CN | 201656686 U | 11/2010 |
| EP | 1381143 A1 | 1/2004 |
| JP | 60210148 A | 10/1985 |
| JP | 61150635 A | 7/1986 |
| SU | 1638769 A1 | 3/1991 |

OTHER PUBLICATIONS

European Search Report dated Jan. 22, 2013.

\* cited by examiner

*Primary Examiner* — Thanh Lam

(57) ABSTRACT

The electric machine (1) comprises a stator (2), a rotor (3), a cooling circuit for the stator (2) and/or rotor (3), fans (20) for cooling fluid circulation. The fans (20) are separated from the rotor (3).

8 Claims, 4 Drawing Sheets

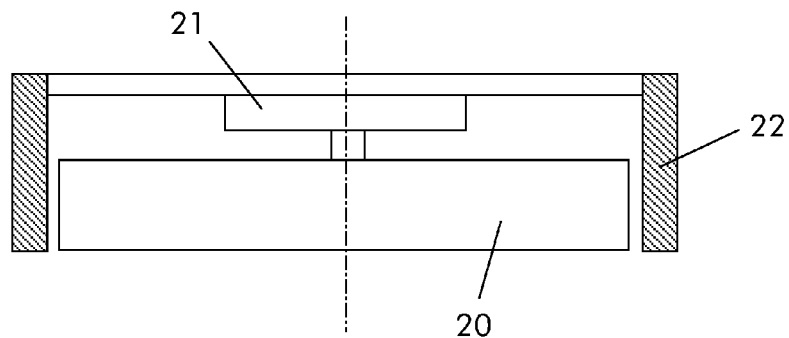
Fig. 12
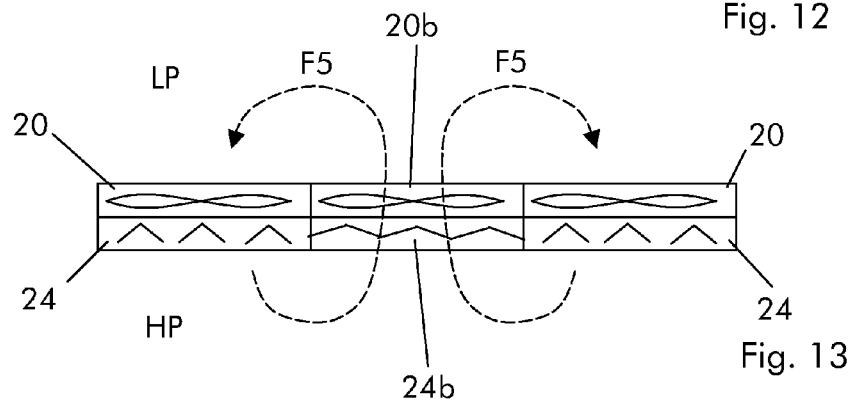
Fig. 13
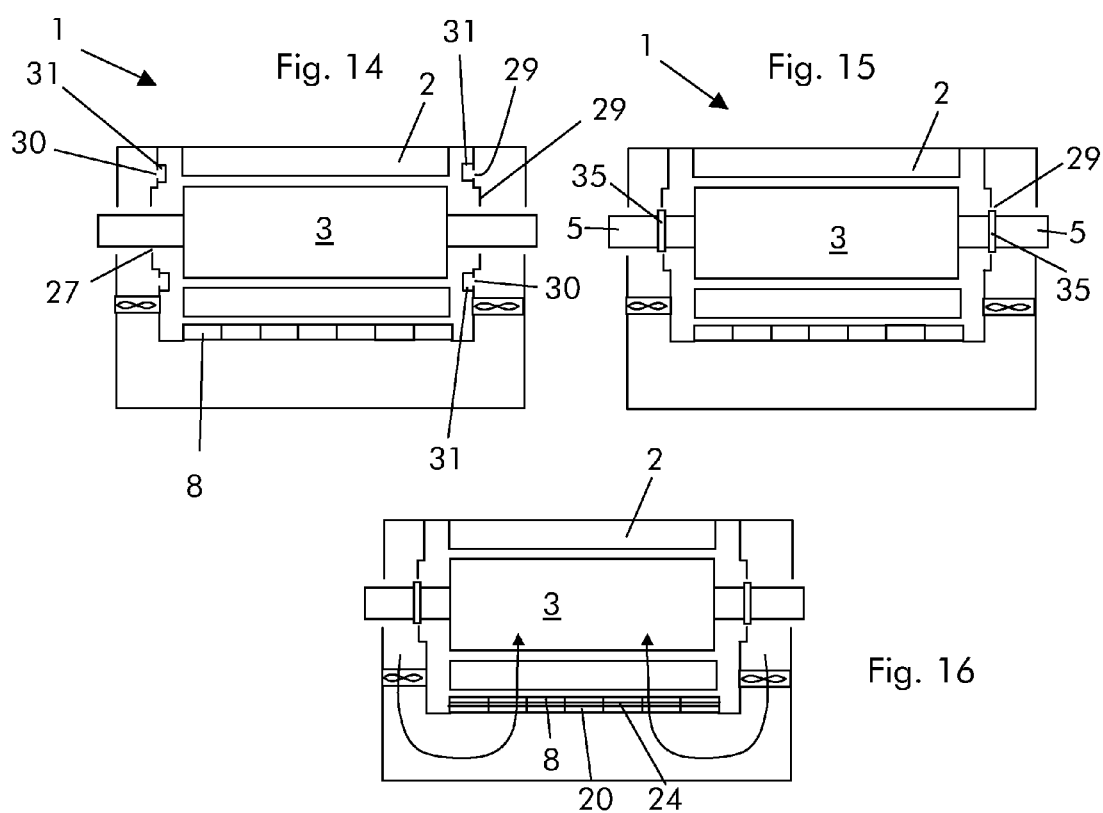
Fig. 14
Fig. 15
Fig. 16

ELECTRIC MACHINE AND METHOD TO RETROFIT AN ELECTRIC MACHINE

TECHNICAL FIELD

The present disclosure relates to an electric machine and a method to retrofit an electric machine.

The electric machine can be an electric generator such as a synchronous electric generator, an electric motor or other different rotating electric machines.

BACKGROUND

With reference to FIG. 9, rotating electric machines 1 have a stator 2 and a rotor 3 housed in a casing 4. From each end of the rotor 3 a shaft 5 extends. The stator 2 and rotor 3 are usually provided with a cooling circuit for taking away the heat generated during operation.

The cooling circuit usually includes channels through the stator 2 and rotor 3 for a cooling fluid and coolers 8 to cool down the cooling fluid. The cooling fluid is the fluid contained in the casing 4 and can be air, hydrogen, argon or a different fluid. In addition, the electric machine also has one or more fans 9 to circulate the cooling fluid.

The fans 9 are connected to the shafts 5 such that, during operation, the shafts 5 activate the fans 9.

This configuration has some drawbacks.

In fact, the speed of the shafts 5 cannot be freely changed to adjust the operating condition of the fans 9 according to the cooling fluid actually needed. In other words, since the fans are designed to provide the cooling fluid needed at full load, during operation at part load they supply an amount of cooling fluid that is larger than the amount actually needed. This causes a waste of power for operating the fans 9 and can also cause cool zones inside of the electric machine.

In addition, the cooling fluid is first cooled in the coolers 8 and is then supplied to the fans 9; when the cooling fluid passes through the fans 9 to be supplied to the stator 2 and rotor 3 its temperature increases. Therefore the temperature of the cooling fluid is not optimised.

SUMMARY

An aspect of the disclosure includes providing an electric machine and a method that require a reduced power for operating the fans and that have a reduced risk of generating cool zones within the electric machine.

Another aspect of the disclosure is to provide an electric machine and a method that can provide an optimised cooling of the stator and rotor.

These and further aspects are attained by providing an electric machine and a method in accordance with the accompanying claims.

BRIEF DESCRIPTION OF THE DRAWINGS

Further characteristics and advantages will be more apparent from the description of a preferred but non-exclusive embodiment of the electric machine and method, illustrated by way of non-limiting example in the accompanying drawings, in which:

FIG. 12 shows a fan connected to a motor;

FIG. 13 shows a plurality of fans;

FIGS. 14 through 16 disclose additional embodiments of the electric machine in embodiments of the disclosure.

DETAILED DESCRIPTION OF EXEMPLARY EMBODIMENTS

Figure 1:
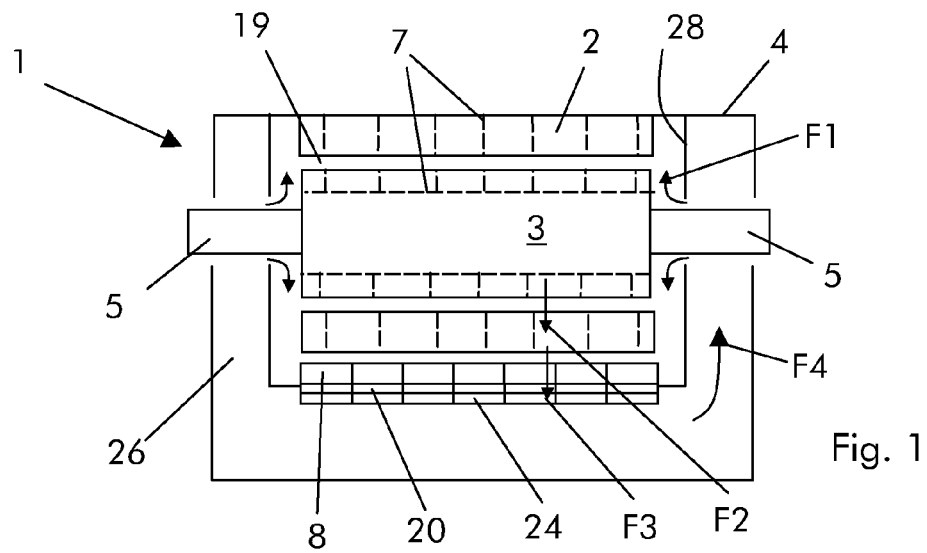
FIG. 1 is a schematic view of an embodiment of the electric machine.
Figure 2:
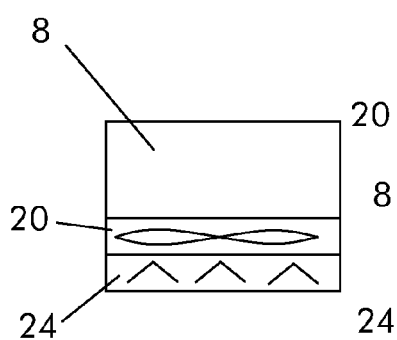
FIGS. 2 through 6 show different examples of fans, one-way valves and coolers connected one another.
Figure 3:
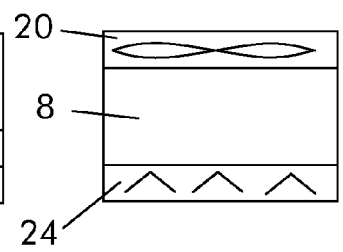
Figure 4:
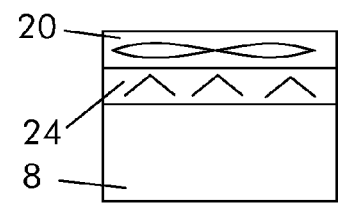
Figure 5:
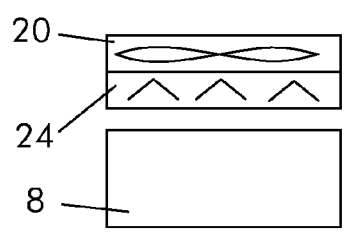
Figure 6:
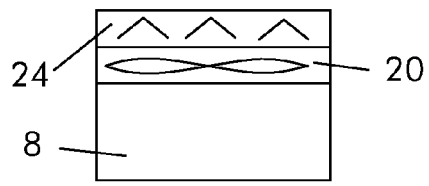

In the following like reference numerals designate like or corresponding parts throughout the several views.

The electric machine 1 can be an electric generator such as a turbogenerator (i.e. a synchronous generator to be connected to a gas turbine or a steam turbine) a hydro generator (i.e. a synchronous generator to be connected to a hydro turbine), a different kind of generator (for example an asynchronous generator), a synchronous or asynchronous electric motor, and so on.

The electric machine 1 comprises a stator 2 and a rotor 3. The stator 2 and/or rotor 3 have a cooling circuit that can include channels (like the channels 7 in the drawings) but in different examples the cooling circuit can only include the gap 19 between the stator 2 and rotor 3 and passages to recirculate the cooling fluid like the lateral passages 26 shown in the drawings. In addition the coolers 8 are only provided when needed. Stator 2 and rotor 3 are housed in the casing 4 that also houses the cooling fluid. The cooling fluid is usually a gas such as air, hydrogen, argon, etc.

In the examples shown the cooling circuit also includes coolers 8; it is clear that these coolers 8 are not mandatory and are only provided when needed according to the cooling scheme.

In order to circulate the cooling fluid through the cooling circuit (and in general through the electric machine), one or more fans 20 are provided.

These fans 20 are separated from the rotor 3; in other words the fans 20 are not supported by the rotor 3.

The fans 20 can have one or more motors for their activation; FIG. 12 shows an example of motor 21 connected to a frame 22 and a fan 20. Naturally also different examples are possible.

In a preferred embodiment, the electric machine 1 comprises a plurality of fans 20 and at least one fan 20 is activatable independently of the at least another fans 20; anyhow preferably each fan 20 is operable independently of the others.

In addition, the electric machine 1 also has one-way valves 24 associated to the fans 20 (for example the electric machine 1 can have a one-way valve 24 for each fan 20, or a one-way valve 24 for more than one fan 20 or more one-way valves 24 for each fan 20; every combination is anyhow possible.

The one-way valves 24 can have a frame that houses thin metal sheets that hinder flow in one direction.

The one-way valves 24 are positioned upstream and/or downstream of the fans 20. FIGS. 2 through 6 show possible connections among the fans 20, one-way valves 24 and coolers 8. It is clear that the coolers 8 can be connected to the fans 20 and/or one-way valves 24 or not, and the fans 20 can be connected to the one-way valves 24 or not.

For example, each one-way valve 24 is connected to a fan 20.

Figure 7:
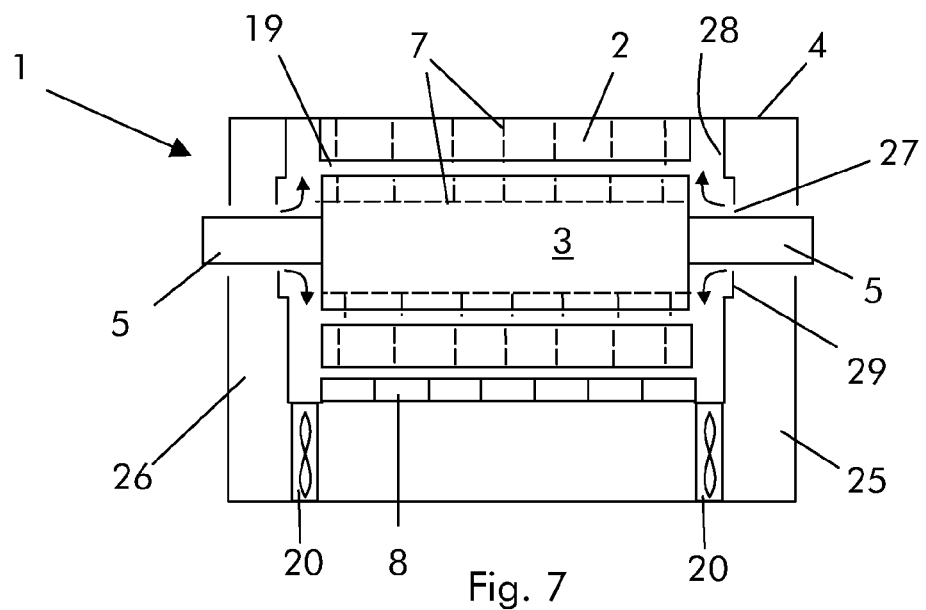
FIGS. 7 and 8 show two different embodiments of electric machine.
Figure 8:
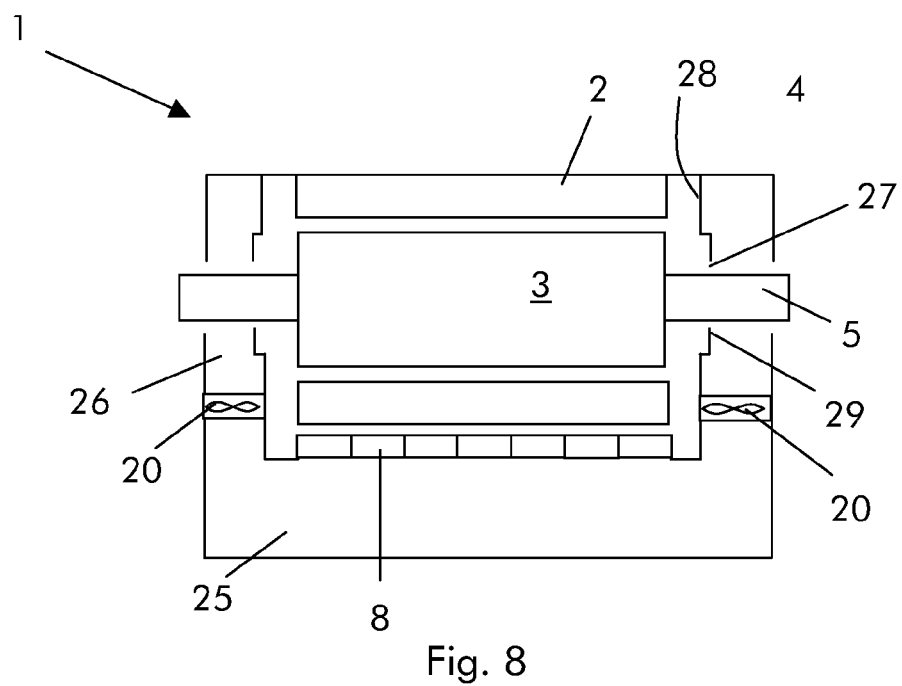

The fans 20 can be located at a lateral side of the electric machine 1, for example within the foundation 25 that houses the electric machine 1. The fans 20 can be connected to the coolers 8 (FIG. 1) or can be housed at the bottom of the foundations 25 (FIG. 7) or can be located at the lateral passages 26 of the electric machines 1 that bring cooling fluid to the stator 2 and rotor 3. Other possibilities are anyhow possible.

In addition, the rotor can also be provided with small additional fans 35 connected to one or both shafts 5 of the rotor. These fans 35 can be similar to the fan 9 of the known electric machines, but they are smaller, smaller meaning that they are only able to provide a part of the cooling fluid for the stator 2 and rotor 3, i.e. the fans 35 are not able to provide the whole cooling fluid for the stator 2 and rotor 3. For example the fans 35 can provide a part of the cooling fluid needed at prefixed part load conditions; this can for example be useful at start up. FIG. 15 shows such an embodiment.

In addition, apertures 30 can be provided at the wall 28, and, preferably, one-way valves 31 can be provided at the apertures 30.

The cooling circuit of the electric machine can also be a reversed cooling circuit (FIG. 16). With this solution:
the one-way valves 24 have a closed default state (for example they can be closed by gravity); this can increase reliability;
with this scheme the coolers 8 are close to the stator 2 and rotor 3 and possible heating due to circulation of the cooling fluid can be reduced.

The operation of the electric machine 1 is apparent from that described and illustrated and is substantially the following.

Cooling fluid F1 passes through a gap 27 between walls 28 delimiting the zone of the casing 4 that houses the stator 2 and rotor 3; these walls 28 are considered part of the casing 4. Then the cooling fluid F2 passes through the cooling circuit and cools the stator 2 and rotor 3. Thus the cooling fluid F3 passes through the coolers 8, fans 20 and one-way valves 24 to be then supplied again to the stator 2 and rotor 3 through the gap 27 (arrow F4).

FIG. 13 shows the advantageous operation of the one-way valves 24 and fans 20 operable independently of each other.

The fans 20 create a lower pressure zone LP upstream of them and a higher pressure zone HP downstream of them. In case a fan 20b fails, a cooling fluid recirculation could be generated as indicated by arrow F5; this could reduce the amount of cooling fluid that cools the stator 2 and rotor 3.

In this case the one-way valve 24b prevents such a recirculation because it prevents the flow from the HP zone to the LP zone. In addition, since the fans 20 are operable independently of each other, the fans that are not damaged can be regulated to provide to the stator 2 and rotor 3 a higher amount of cooling fluid, such that stator 2 and rotor 3 receive the correct amount of cooling fluid also in case one or more fans 20b fail.

The present disclosure also refers to a retrofit method of an electric machine 1.

Figure 9:
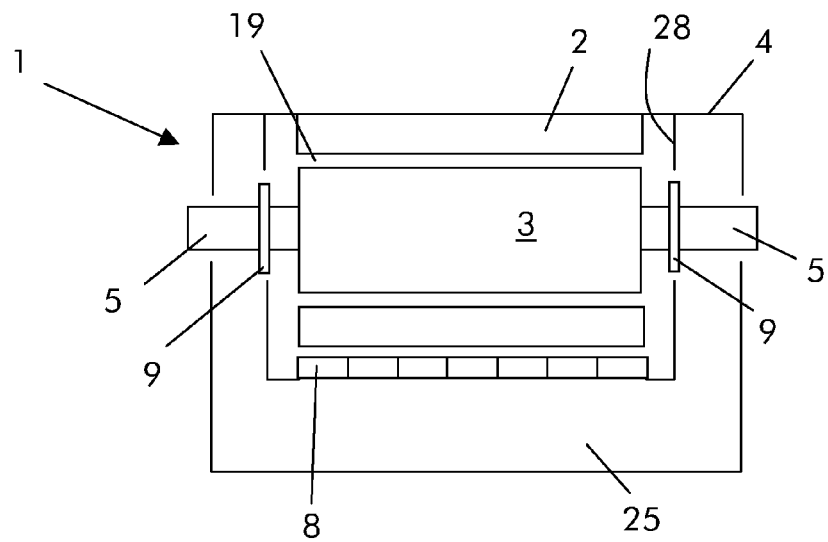
FIGS. 9 through 11 show steps of the retrofit method.

The electric machine 1 to be retrofitted (FIG. 9) has the stator 2 and the rotor 3 with a cooling circuit for the stator 2 and/or rotor 3. In addition, the electric machine 1 has one or more (according to its particular design) fan 9 for cooling fluid circulation through the cooling circuit; the fans 9 are supported by the rotor 3.

Figure 10:
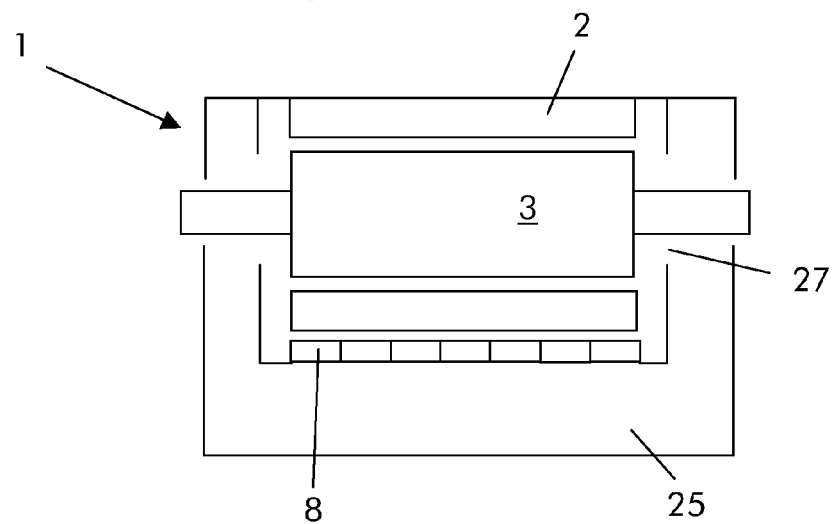
Figure 11:
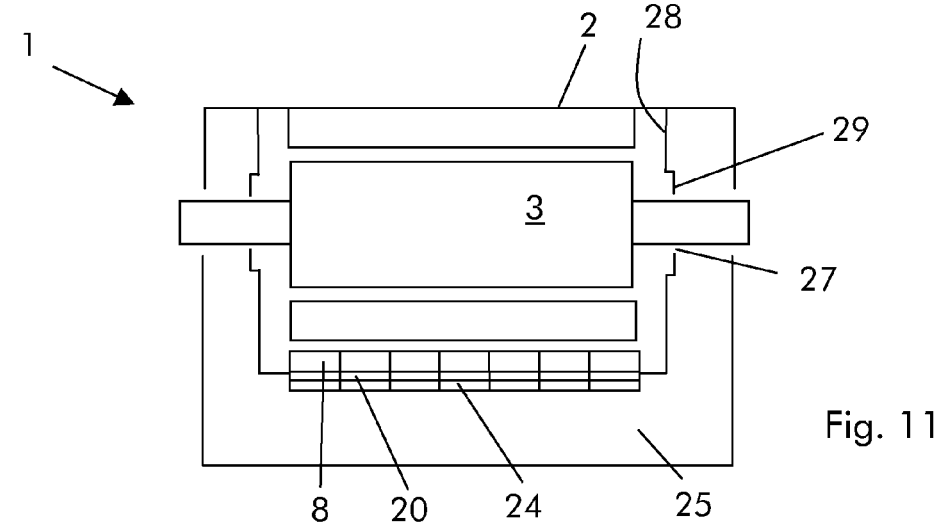

According to the method, the fans 9 originally connected to the rotor 3 are removed (FIG. 10).

Thus one or more new fans 20 (according to the design) are provided; the new fans 20 are separated from the rotor 3 also during operation.

Since when the fans 9 are removed from the rotor 3 gaps 27 remain, obstructions 29 can be provided to partially close the gaps 27. The obstruction 29 is for example a plate that is preferably connected to the stator 2 and/or casing 4. Anyhow this feature is not mandatory and can be implemented according to the needs and the design of the electric machine.

In addition, the gaps 27 can also be made larger or apertures 30 can be provided to the wall 28, in order to increase the cooling fluid flowing towards the stator 2 and rotor 3 according to the needs. Preferably, one-way valves 31 are provided at the apertures 30. Anyhow also this feature is not mandatory and can be implemented or not, according to the needs and the design of the electric machine. In addition, the apertures 30 could also be provided together with the obstruction 29 (FIG. 14).

The fans 9 can also be replaced by the small fans 35. The fans 35 can thus be used:
with or without the apertures 30,
with or without the obstructions 29.

It has been found in practice that the electric machine is particularly advantageous because:
it has a high efficiency at part load, because at part load the fans 20 only require the power needed for cooling at part load conditions, i.e. they are not bound by the rotor speed;
the temperature of the electric machine can be kept constant or almost constant, this lets a longer lifetime for the electric machine because of the less thermal stresses;
the noise generated by the electric machine can be reduced, because instead of large fans rotating at a fixed speed, smaller fans rotating at an adjustable speed are provided.

Electric machines according to the disclosure are useful in particular for air cooled electric machines, because the efficiency of these kinds of machines drops at part load. It is anyhow clear that electric machines can also be a hydrogen, argon or water cooled electric machines as well.

Naturally the features described may be independently provided from one another.

In practice the materials used and the dimensions can be chosen at will according to requirements and to the state of the art.

The invention claimed is:

1. An electric machine comprising:
a stator;
a rotor;
a cooling circuit for at least one of the stator and rotor;
a plurality of fans for cooling the fluid circulation, the plurality of fans being separated from the rotor;
wherein each of the plurality of fans are configured to be activatable independently of any other fan of the plurality of fans; and
at least one one-way valve fluidly associated to the plurality of fans;
wherein when the electric machine is at part load, the plurality of fans are configured to only require power needed for cooling the electric machine at part load conditions.

2. The electric machine according to claim 1, comprising: at least one motor for activation of the plurality of fans.

3. The electric machine according to claim 1, wherein the at least one one-way valve is connected to at least one fan of the plurality of fans.

4. The electric machine according to claim 1, comprising: a cooler located at a lateral side of the electric machine, at least one fan of the plurality of fans being connected to the at least one cooler.

5. The electric machine according to claim 1, comprising: a foundation for housing the electric machine, wherein the plurality of fans are housed within the foundation.

6. The electric machine according to claim 1, comprising:
additional fans wherein the rotor is provided with the additional fans connected to one or both shafts thereof, the additional fans being able to provide a part of the cooling fluid for the stator and the rotor.

7. The electric machine according to claim 1, comprising:
a higher pressure zone (HP);
a lower pressure zone (LP);
a wall between the higher pressure zone and the lower pressure zone, wherein the wall has apertures.

8. The electric machine according to claim 1, wherein the electric machine is an electric generator.

\* \* \* \* \*